United States Patent Office 3,271,561
Patented Sept. 6, 1966

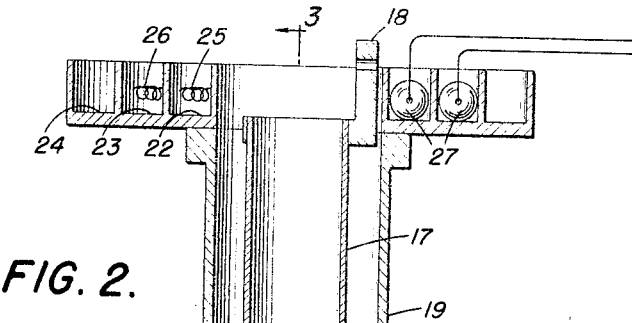
FIG. 2.
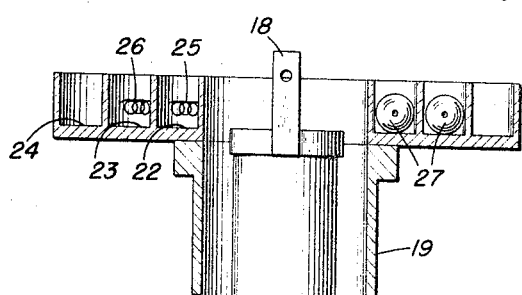
FIG. 3.
INVENTORS
WALLACE A. FIEDLER
GILBERT H. ROSS
ROBERT A. ESTOCK
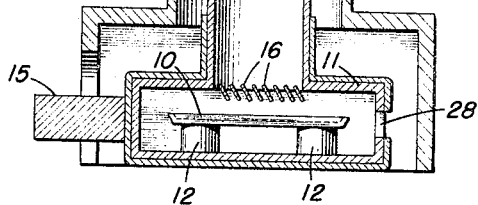
ATTORNEY

3,271,561
APPARATUS FOR THERMALLY EVAPORATING VARIOUS MATERIALS IN VACUUMS FOR PRODUCING THIN FILMS
Wallace A. Fiedler, Englewood, and Gilbert H. Ross and Robert A. Estock, Denver, Colo., assignors to Martin-Marietta Corporation, Baltimore, Md., a corporation of Maryland
Filed Mar. 2, 1964, Ser. No. 348,594
6 Claims. (Cl. 219—271)

This invention relates to the art of vapor deposition of solid materials upon a substrate. More particularly it relates to an improved apparatus and method by which very thin uniform films of solid substances are deposited upon a substrate through the vaporization and subsequent condensation of film-forming materials. Although the teachings contained herein are applicable to the manufacture of a variety of coated products, they have particular utility in the production of so-called thin film circuits and thin film circuit components.

As used in the following text, the terms "evaporant," "coating material" and "film-forming material" are synonymous.

In the production of vapor-deposited thin films, typically carried out at very low pressures, a common objective, regardless of the utility of the end product, is the achievement of a uniform coating free from irregularities such as pinholes or coarseness of deposit. However, among the problems frequently encountered is the tendency of some film-forming evaporants during the evaporating process to spit off comparatively large particles as a result of small explosions caused by vaporization taking place beneath a surface of the material undergoing vaporization. If these particles reach the article to be coated and are deposited thereon, they cause the deposited film to be nonuniform and the surface of the article to be pitted.

In addition, although the film-forming material may vaporize to form an atomic or molecular vapor, the quality of the film may be poor if the vapor reaches the substrate upon which it is to be deposited in the form or molecular aggregations. Such aggregations may occur when the atoms or molecules of the vapor collide with one another and coalesce in large numbers. The less the kinetic energy of the atoms or molecules, the greater is the tendency to form such molecular aggregations through coalescence.

It is therefore a general object of this invention to provide an improved apparatus and method for the production of film-forming vapors substantially free of solid particles or molecular aggregations and for the subsequent deposition from such vapors of very uniform thin films.

The splitting off of solid particles during the evaporation process may be due to different factors. One of such factors is the presence in the film-forming solid material of small quantities of foreign substances having higher vapor pressures at given temperatures than the vapor pressure of the coating material. To some extent, then, spitting may be minimized by controlling the purity of the coating material. However, another factor contributing to the throwing off of solid particles during vaporization is the nonuniformity of the heating process by which the coating material is evaporated. The larger the thermal gradients produced in the material to be vaporized, the more it is likely that the vapor will be contaminated by solid particles.

This invention therefore has as a more specific object the provision of an improved apparatus and process for heating a charge of coating material uniformly without producing substantial thermal gradients therein.

Since the tendency of a vapor to form molecular aggregations increases with the loss of kinetic energy by the vaporized material, another object of the invention is to provide an improved apparatus for preserving the vapor in an isothermal condition in its passage from the source to the ultimate substrate.

In the production of thin film microminiature electrical circuits in particular, it is frequently necessary to produce a series of coatings of different materials applied sequentially to a substrate under high vacuum conditions. Often it has been necessary to break the seal on the vacuum chamber in which the coating processes are carried out to permit changes in apparatus to be made between successive coatings. This naturally prolongs and complicates the coating process and necessitates periodic re-establishment of high vacuum conditions in producing a single circuit element.

It is a still further object of this invention to provide a unitary multiple deposition evaporation source for producing vacuum-deposited circuits and circuit elements without the necessity of breaking the seal on the vacuum chamber between coatings.

In carrying out the invention in a preferred form a charge of dielectric evaporant consisting of powdered silicon monoxide is spread thinly on a flat tray of tantalum. The trays is supported by ceramic beads within a rectangular heating chamber, also of tantalum, equidistant from the top and bottom of the chamber. The top, bottom and side walls of the heating chamber, being of equal thickness throughout their lengths, are heated by passing electrical currents therethrough from each end to a common terminal, preferably grounded, located between the ends of the chamber to raise the temperature of the evaporant by radiant heating. The suspension of the tray within the heating chamber is such as to minimize thermal conductivity from the heating chamber to the charge of dielectric coating material. Over the tray a louvered opening in the top of the heating chamber communicates directly with a vertically extending chimney-like tube of tantalum. The latter, too, is heated by the passage of electrical currents therethrough to maintain the vapor cloud within it in an isothermal condition as it rises toward the substrate upon which a film is to be deposited by condensation. A shield surrounding the heating chamber and its vertically extending tube prevents unnecessary radiation losses and helps maintain both in a thermal condition approximating a perfect black body so that the vapor cloud which issues from the top of the tube to be deposited on a substrate is uniform and isothermal.

Around the top of the vertically-extending chimney are arrranged concentric annular receptacles in which additional coating materials are placed. For example, an electrically resistant material is placed in one annulus and an electrically conductive material in another annulus. Each annulus includes a separately controllable filament heater for heating and evaporating the material associated therewith. The entire assembly constitutes a multiple vacuum deposition source for providing separate types of layers in sequence upon a basic substrate. In practice, a substrate partially shielded by a mask is placed over the multiple deposition source and one of the heaters is energized to produce the first coating upon the substrate. Thereafter a new mask is moved into place between the deposition source and the substrate and another of the heaters is energized to produce the second desired coating on the substrate.

Although the scope of this invention is not to be limited except by a fair interpretation of the appended claims, further details of the invention as well as additional objects and advantages will be more readily percieved with reference to the following more complete description taken in connection with the accompanying drawings wherein:

FIGURE 2 is a cross-sectional side view of the device illustrated in FIGURE 1 showing it assembled; and FIGURE 3 is a cross-sectional end view taken on line 3—3 of FIGURE 2.

Figure 1:
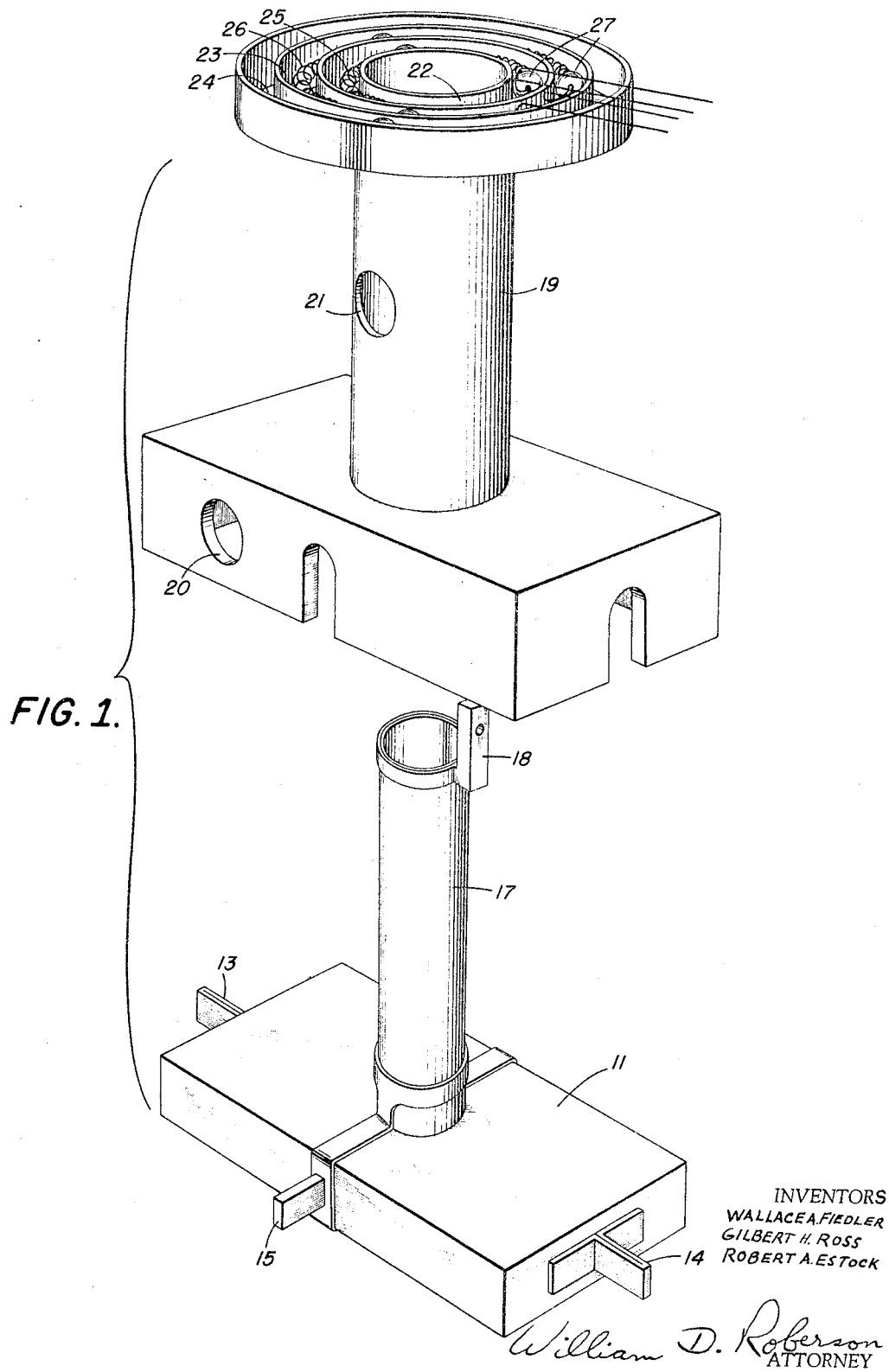
FIGURE 1 is a partially exploded perspective view of a device constructed according to these teaching for vaporizing a plurality of materials in a vacuum.

The apparatus shown in the figures is adapted especially for the production of thin film microminiature circuits. In use the illustrated apparatus is placed in a vacuum chamber and the substrate upon which predetermined layers are to be deposited is positioned upside down over the apparatus with a mask covering those portions of the substrate where film-forming materials are not to be deposited. In order to provide for the formation of conductors, resistors, and capacitors, the apparatus includes means for evaporating metallic conductive materials, electrically resistant materials, and dielectric materials. Although it is important to maintain a high degree of uniformity in laying down each of these materials on a substrate in the formation of microminiature circuits, the uniformity of the dielectric material deposited in formation of capacitors is particularly critical. This is so because the slightest pinhole in the dielectric layer of a capacitor would utterly destroy its utility whereas pinholes in the resistors or in the conductive elements are often tolerable. In producing microminiature circuits according to prior art methods, effective dielectric films for capacitive circuit elements have been produced in layers as thin as three thousand Angstrom units. In the practice of this invention with apparatus of the type depicted, dielectric layers at least as thin as 300 Angstrom units may be deposited to produce a uniform and fully acceptable capacitor dielectric. Indeed, we have produced capacitor dielectrics as fine as 125 Angstrom units thick. Consequently, within the limits of any given physical dimensions for a microminiature circuit the capacitance of a capacitor can be increased by a factor of more than ten. The dielectric material preferably employed in the production of capacitive circuit elements in accordance with this invention is silicon monoxide.

The apparatus for the vaporization and subsequent deposition of silicon monoxide includes a very thin flat tray 10 on which is placed high grade crushed silicon monoxide of optical purity, preferably 99.9% pure. The tray upon which the silicon monoxide is placed is formed of a material such as tantalum whose vapor pressure must be negligibly small at the temperatures to which it is to be heated so that no appreciable amount of the tray material is vaporized to contaminate the vapor to be formed. The tray 10 is suspended at the approximate center of a rectangular heating chamber 11, being supported there by ceramic beads 12 having low electrical and thermal conductivity. The chamber is preferably formed of tantalum, an electrically conductive material with very low vapor pressures at high temperatures, in sheet form about .003 inch in thickness. It is provided at opposite extremities with electrical terminals 13 and 14, and at its center with terminal 15. In use, the receptacle is heated by the passage of controllable electrical currents through the terminals and walls of the chamber. Terminal 15, which is attached strap-like around the central portion of the heating chamber 11, may be connected to one output terminal of a source of variable electrical power and terminals 13 and 14 to the other output terminal of the power source. The ceramic support elements 12 effectively isolate the tray and its contents from thermal and electrical conduction, permitting the tray to be subjected only to radiant heat from the inner walls of the chamber 11. This method of heating the vaporizable substance has important consequences upon the uniformity of the layer to be deposited.

At the top of the chamber 11 over the tray 10 an aperture is provided for the escape of the silicon monoxide vapors resulting from the heating. The aperture is, however, covered by louvers 16 which interfere with the passage of any solid particles which might be thrown off but which permit the passage therethrough of true vapors. Atop the aperture and over the louvers 16 there is provided a chimney-like extension 17, also formed of tantalum, which bears at its upper and lower ends terminals 18 and 15 respectively. Controllable electrical currents are also passed through terminal 18 and through the vertically extending walls of the chimney to common terminal 15 to heat the chimney to the same temperature as that of the chamber 11. The silicon monoxide vapors which pass through the louvers 16 in the aperture rise, then, through a chimney heated to the same temperature and emerge from the top of the chimney in an isothermal condition, because the heated chamber and the chimney approximate a perfect black body. Because the silicon monoxide vapors are uniformly heated in a radiant fashion, we have found that much higher deposition rates are possible than were obtained either by the spotty conducted heating methods or by the radiant heating methods using small radiant heat sources employed in previous vaporizing apparatus. The vaporization and redeposition of the silicon monoxide is preferably carried out at pressures as low as $5 \times 10^{-6}$ torr. We have found that higher vaporization and redeposition rates are obtainable with finely ground silicon monoxide since more surface area of the silicon monoxide is exposed.

To further increase the speed of vaporization and to further improve the black body characteristics of the heating chamber 11 and chimney 17, a heat shield 19 having larger dimensions than the chamber and chimney is set over the combined apparatus. This heat shield confines the heat generated within the assembly, promotes uniformity of temperature, and prevents destructive heating of other materials which may be contained within the vacuum chamber. Preferably the heat shield is also formed of tantalum .020 inch in thickness because of the previously mentioned properties of this metal to reduce the possibility of the introduction of contaminants into the system. All seams, flanges, and electrical connections are formed of tantalum and all joints are resistance welded. Apertures 20 and 21 are left in the heat shield as view ports through which measurements of the temperature of the chamber and chimney may be made by means of an optical pyrometer. We have found, however, that instead of measuring the temperature optically each time the evaporation source is used, an optical pyrometer may conveniently be employed to calibrate the temperatures of the heating chamber and chimney with the electrical power inputs.

With such an evaporation source it is possible to form vapor-deposited thin film capacitors with dielectrics possessing capacitance as high as 0.5 microfarad per square centimeter and having a 7 volt breakdown potential. This capacitance is greater by a factor of 15 than the normal industry standard for silicon monoxide dielectric capacitors. The thickness of the extremely thin, pinhole-free deposits thus produced can be controlled closely from approximately 100 Angstrom units to 10,000 Angstrom units. Because the dielectric material evaporated by this apparatus is heated radiantly from all sides, the evaporation rates are not dependent upon a heat surface contact area as in prior apparatus. We have found consequently that the evaporation rate is remarkably constant even though the amount of solid evaporant may vary, and a uniform evaporation rate may be maintained until the evaporant is virtually exhausted. Indeed, the deposition rate is so uniform that we have found it convenient and useful to employ a shutter to cover and uncover the substrate at closely timed intervals to deposit dielectric films of preselected thicknesses.

In accordance with a further feature of this invention, it is possible to deposit a variety of layers of different materials in sequence on a basic substrate without removing the substrate or the vapor deposition apparatus from the vacuum chamber in which they are situated. For this purpose there is provided at the top of heat shield 19 a plurality of annular containers 22, 23, and 24 open at the top. Each of the annuli may contain in use a different evaporant. For example, in annulus 22 there may be powdered aluminum for the formation of conductive layers or patterns on a substrate. Annulus 23, on the other hand, may contain a nickel chrome alloy for the formation of resistive circuit elements. It is to be understood, of course, that in the practice of this invention other materials may also be employed without departing from the principles of this invention. Annulus 24 may be used for the evaporation of still another material as desired or for other purposes, such as the support of a high voltage glow discharge ring for the cleaning of substrates in a known manner. In annulus 22 and 23 are positioned separately energizable filaments 25 and 26 respectively for heating and evaporating the material associated therewith. Filaments 25 and 26 are supported within their respective annuli by ceramic insulating elements 27. These filaments are electrically insulated from the associated powdered materials by a layer of oxide on the external surfaces of the filaments.

In producing a thin film circuit, a typical order in which the manufacturing steps might be carried out with apparatus of the type described is as follows. First a layer of pulverized silicon monoxide is spread on tray 10 and the tray is inserted within the heating chamber 11 through a slot 28 in the side of the chamber. Incidentally, we have found that very little of the dielectric material evaporates through slot 28. Annuli 22 and 23 are then filled respectively with conductive and resistant materials. The substrate is then positioned centrally about six inches over the multiple deposition apparatus with a prefigured mask covering all but those portions of the substrate upon which the first layer is to be deposited. The entire assembly is then sealed in a vacuum chamber and the pressure is reduced, preferably to about $5 \times 10^{-5}$ torr. The material most likely to be deposited first would be the conductive material in annulus 22 and the filament in this annular container is therefore energized first, without applying power to the other filaments or to the heating chamber 10. Filament 25 will first melt and then evaporate the aluminum or other conductive material within annulus 22 to produce the first conductive layer upon the substrate. When the conductive layer has been deposited in sufficient thickness the electrical power is removed from filament 25 and the next prefigured mask is positioned mechanically over the substrate.

The next step may be the deposition of a resistive material by the energization of filament 26 or it may be the evaporation and redeposition of a dielectric material by heating the walls of chamber 11 and chimney 17. The thickness of the silicon monoxide layer deposited by this means can be monitored by optical means as previously mentioned or, alternatively, the thickness can be determined by timing the operation against a precalibrated deposition rate. In this manner a number of circuit elements and configurations can be formed by thin film deposition techniques without interrupting the process by the destruction of the vacuum conditions surrounding the apparatus. In the formation of a capacitor, for example, one plate of the capacitor and its associated electrical connections can be formed by the deposition of a conductive material. Thereafter, the dielectric is deposited on top of the conducting element and this step is followed by the deposition once again of a capacitor plate on top of the dielectric.

The arrangement of the multiple evaporation sources in circular concentric fashion provides several benefits. First, the length of the filament associated with each annulus exposes a large surface area of evaporant to the heating process and permits a greater evaporation rate than has been possible with typical filaments employed for similar purposes. In addition, the uniformity of the film is improved because of the fact that the vapors which are formed emanate from a larger source than is employed by prior art techniques. The filaments can be made of any of the high temperature, low vapor pressure materials. Tungsten, tantalum or molybdenum are satisfactory. The selection of filament material will naturally be determined in part by the compatibility of the filament with the evaporant.

It is to be understood, of course, that the apparatus specifically disclosed herein is offered by way of illustration of the principles of this invention, and that it should not be interpreted necessarily as limiting the application of these teachings. The disclosure has been simplified somewhat to bring into relief the invention itself, and vibrations in the apparatus will doubtless occur to those skilled in the art to which the invention pertains. Such variations in execution of the apparatus as fall within the true spirit and scope of the present invention in its broader aspects are intended to be covered by the following claims.

What we claim as new and desire to secure by Letters Patent of the United States is:

1. Apparatus for producing an isothermal vapor from a normally solid coating material comprising:
   a hollow chamber formed of an electrically conductive material,
   a first set of electrical terminals connected at spaced-apart portions of said chamber for evenly heating all sides of said chamber by the passage of electrical currents therethrough,
   a container open at the top for supporting a vaporizable material at the approximate center of said chamber to be heated radiantly from the inner surfaces of said chamber,
   an aperture in said chamber over said container, louvered baffle means in electrical contact with said container and covering said aperture to prevent the escape of solid particles therethrough but permitting the passage of vapors therethrough,
   a hollow chimney-like extension of electrically conductive material communicating vertically with said aperture in said chamber defining a passage to conduct vaporized substances toward a surface to be coated,
   a second set of electrical terminals at opposite extremities of said chimney-like extension for evenly heating all of said extension to the temperature of said chamber by the passage of electrical currents therethrough,
   whereby said chamber and said chimney-like extension approximate a perfect black body for the issuance of vaporized substances therefrom.

2. Apparatus for producing isothermal vapors of a normally solid material comprising:
   a chamber formed of an electrically conductive material,
   a first set of spaced-apart electrical terminals connected to said chamber for evenly heating all sides of said chamber by the passage of electrical currents therethrough,
   a container open at the top for supporting a layer of a vaporizable material,
   means supporting said container at the approximate center of said chamber equidistant the top and bottom surfaces thereof to be heated radiantly from the inner surfaces of said chamber,
   an aperture in said chamber over said container,
   a hollow chimney-like extension of electrically conductive material communicating vertically with said aperture in said chamber defining a passage to conduct vaporized substances toward a surface to be coated, a second set of spaced-apart electrical terminals on said chimney-like extension for evenly heating all of said extension by the passage of electrical currents therethrough to the temperature of said chamber, whereby said chamber and said chimney-like extension approximate a perfect black body for the issuance of vaporized materials therefrom.

3. Apparatus for producing isothermal vapors of a normally solid coating material comprising:

a heating chamber of electrically conductive material having an aperture in an upper surface thereof;

a container for the material to be vaporized;

at least one support element of relatively small cross-section and low conductivity supporting said container at the approximate center of said heating chamber out of contact with any of the internal surfaces thereof;

means for evenly heating all sides of said chamber thereby to vaporize the material in said container by uniform radiant heat from the internal surfaces of said chamber;

a chimney-like outlet passage of electrically conductive material connecting with said aperture in said heating chamber for directing vaporized material from said chamber, means for evenly heating said passage by passing electrical currents through the walls thereof, thereby to prevent the loss of thermal energy by vapors of said material as they rise through said passage, whereby said vapors issue from said passage as from a black body.

4. Apparatus for selectively producing vapors of normally solid coating materials comprising:

a heating chamber of electrically conductive material having an aperture in an upper surface thereof;

a container for the material to be vaporized;

at least one support element of relatively small cross-section and low thermal and electrical conductivity supporting said container at the approximate center of said heating chamber out of thermal and electrical contact with any of the internal surfaces thereof;

means for heating said chamber by passing electrical currents through the walls thereof, thereby to vaporize the material in said container by uniform radiant heat from the internal surfaces of said chamber;

a chimney-like outlet passage of electrical conductive material connecting with said aperture in said heating chamber for directing vaporized material from said chamber, means for heating said passage by passing electrical currents through the walls thereof, thereby to prevent the loss of thermal energy by vapors of said material as they rise through said passage, a heat shield surrounding and conforming to the shape of said chamber and said outlet passage to ensure uniformity of heating therewithin, at least one hollow annulus open at the top supported at the upper extremity of said heat shield concentric with the upper end of said outlet passage, an electrical filament in said annulus for vaporizing a coating substance situated within said annulus, whereby different substances may be selectively and sequentially vaporized and redeposited upon a desider substrate by selective electrical energization of said filaments and of said chamber and passage.

5. Apparatus for selectively producing vapors of normally solid coating substances in a vacuum for redeposition in sequence on a substrate comprising:

a hollow chamber open at the top for containing a substance to be vaporized, means for selectively heating the walls of said chamber to vaporize a substance contained therein, thereby to issue vapors from the opening in the top of said chamber, at least one annular container concentrically arranged about the opening in said chamber, said container being open at the top about its circumference for containing vaporizable substances of different types, an electrical heating element in said annular container for vaporizing a substance in said container, whereby each of the substances contained in said chamber and said container may be selectively and sequentially vaporized and redeposited on a substrate without destroying said vacuum.

6. Apparatus for producing an isothermal vapor from a normally solid coating material comprising:

a hollow chamber formed of an electrically conductive material and having an aperture in the top thereof;

a chimney of electrically conductive material connected to said chamber and extending above said aperture defining a passage to conduct vaporized substances toward a surface to be coated;

a central terminal connected to the lower portion of said chimney and adapted to be connected to one output terminal of a source of variable electrical power;

a pair of end terminals connected to opposite ends of said hollow chamber and equally spaced from said central terminal, said end terminals being adapted to be connected to the other output terminal of said power source;

an upper terminal connected to said chimney adapted to be connected to said other output terminal of said power source and spaced from said central terminal so that said chimney is heated to the same temperature as said chamber when said terminals are connected to said power source; and means for supporting said coating material within said chamber, whereby said vapors issue from said aperture of said chamber as from a black body.

References Cited by the Examiner

UNITED STATES PATENTS

| | | | |
|---|---|---|---|
| 1,831,151 | 11/1931 | Walker | 219—210 |
| 2,793,609 | 5/1957 | Tzu En Shen et al. | 117—107 |
| 2,940,873 | 6/1960 | Toohig | 118—49 X |
| 3,172,778 | 3/1965 | Gunther et al. | 117—106 X |

ANTHONY BARTIS, *Primary Examiner.*

RICHARD M. WOOD, *Examiner.*

C. L. ALBRITTON, *Assistant Examiner.*